(No Model.)
F. C. SMITH & J. W. WEITZELL.
VEHICLE SPRING.
No. 283,525. Patented Aug. 21, 1883.
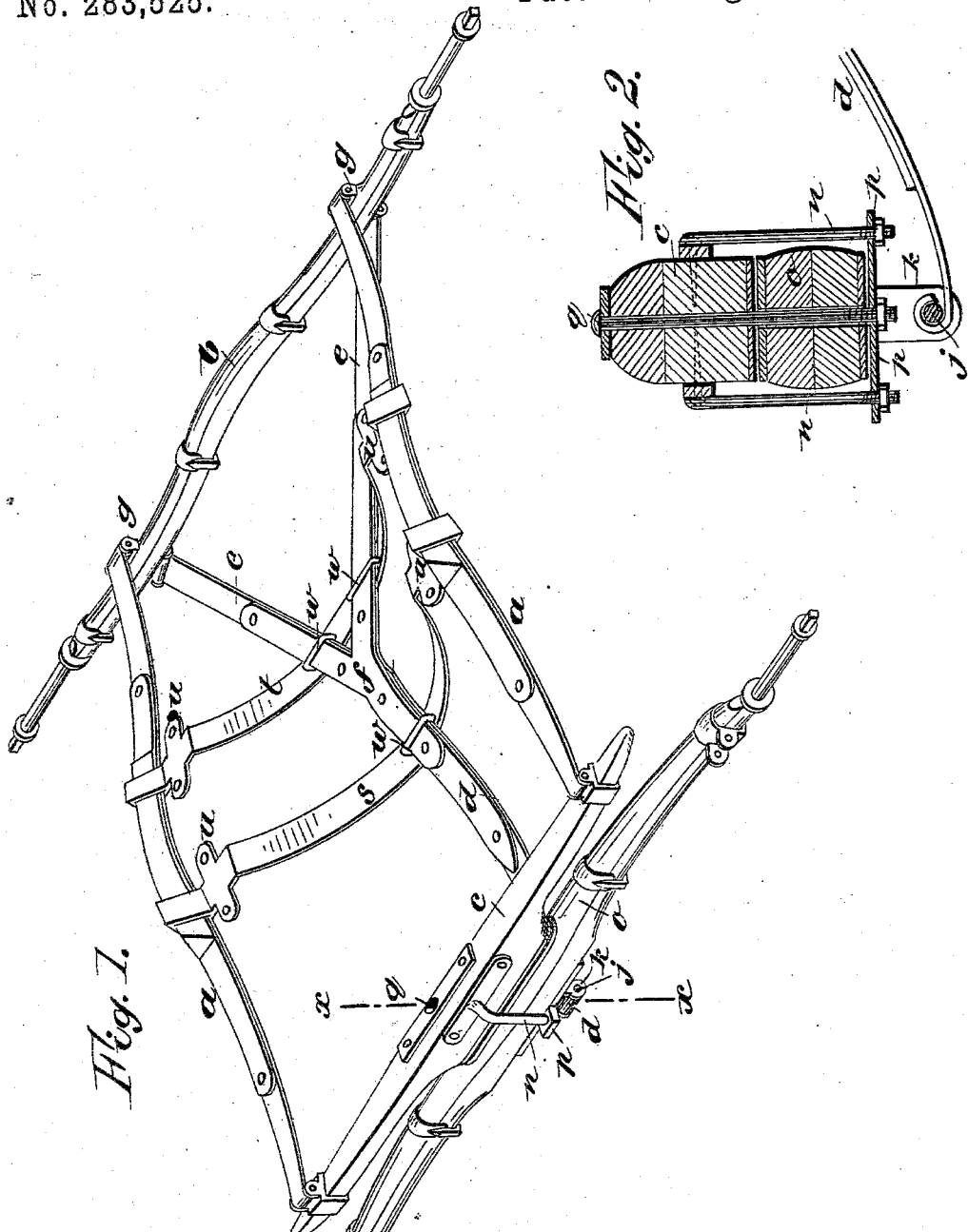
WITNESSES:
INVENTOR:
F. C. Smith
J. W. Weitzell
BY Munn & Co.
ATTORNEYS.

United States Patent Office.

FREDERICK C. SMITH AND JOHN W. WEITZELL, OF ATLANTA, GEORGIA.

VEHICLE-SPRING.

SPECIFICATION forming part of Letters Patent No. 283,525, dated August 21, 1883.

Application filed February 13, 1883. (No model.)

*To all whom it may concern:*

Be it known that we, FREDERICK C. SMITH and JOHN W. WEITZELL, both of Atlanta, in the county of Fulton and State of Georgia, have invented a new and Improved Vehicle-Spring, of which the following is a full, clear, and exact description.

The object of the invention is to improve a side-spring running-gear, as hereinafter described, and pointed out in the claim.

Reference is to be had to the accompanying drawings, forming a part of this specification, in which similar letters of reference indicate corresponding parts in all the figures.

Figure 1 is a perspective view of a pair of axles with our improved spring-gear applied, and Fig. 2 is a section of Fig. 1 on the line $xx$.

The side springs, $a$, may be of any approved half-elliptic form, connected at the top of the rear axle, $b$, and also to the bolster $c$, with which we propose to employ an intermediate spring consisting of the front part, $d$, and two branches, $e$, in the rear part, the said parts uniting at a fork, $f$, about midway between the axles.

As shown, the branches $e$ connect to the axle $b$ on its lower side by the same joint-clips $g$ by which the side springs, $a$, are connected to it; but this arrangement may be varied to suit wagon-bodies of different widths, and the attachment made at any intermediate points by separate clips, as circumstances may require.

The front end of the part $d$ of the intermediate spring is connected to the pin $j$ of a clip, $k$, secured to the bolster $c$ by the T-bolts $n$, and located under the front axle, $o$, said bolts $n$ being bolted by their heads to the sides of the bolster, and extending down the sides of the axle and through the cross-plate $p$ of said clip, through which the bolster pivot-bolt $q$ also passes. The spring $d\,e$ is also connected to the cross-bars $s$ and $t$, attached to the side springs, $a$, and having the rests $u$, whereon the body is mounted and secured. These cross-bars are suitably curved downward between the side springs to pass under the intermediate spring, and it is connected to them by the staples $w$.

It will be seen that we provide a spring-gear having much greater strength laterally than others now in use, by which the hind wheels will not fail of tracking properly with the front ones, and the body will be free from lateral vibration, making the wagon much easier to the rider, and protecting the body-bolts from being worked loose, which is a common result in the case of spring-gear having lateral play.

Having thus fully described our invention, we claim as new and desire to secure by Letters Patent—

The Y-spring for side-bar vehicles, consisting of the front part, $d$, and the diverging rear branches, $e\,e$, the former adapted for attachment under the front and the branches under the rear axle, as shown and described.

FREDERICK C. SMITH.
JOHN W. WEITZELL.

Witnesses:
AUGUSTUS L. HOLBROOK,
JAMES A. CURTIS.